United States Patent

[11] 3,590,932

[72] Inventors Jens P. Dybwad;
 Karl P. Zinnow, both of Arlington, Mass.
[21] Appl. No. 33,444
[22] Filed Apr. 30, 1970
[45] Patented July 6, 1971
[73] Assignee The United States of America as represented by the Secretary of the United States Air Force

[54] LIGHT PRESSURE OPERATED MICROBALANCE
 10 Claims, 1 Drawing Fig.
[52] U.S. Cl. .................................................... 177/210,
 177/1, 177/212, 177/178, 177/196
[51] Int. Cl. ......................................................... G01g 3/00,
 G01g 7/00, G01g 23/32
[50] Field of Search ............................................. 177/1, 210,
 DIG. 196, 212, 213, 171

[56] References Cited
UNITED STATES PATENTS
2,360,751 10/1944 Ziebolz ........................ 177/210 X
3,061,027 10/1962 Berge et al. ................... 177/210 X

*Primary Examiner*—Robert S. Ward, Jr.
*Attorneys*—Harry A. Herbert, Jr. and Jacob N. Erlich

ABSTRACT: A microbalance utilizing the pressure of light for counterbalancing small changes in mass or force on the balance having a balance device and measuring device. The sample to be investigated is supported by the balance device, while the counteracting light pressure is reflected from the measuring device to the balance device. A detector determines when the balance device is out of equilibrium and accordingly varies the intensity of the light in order to counteract the unbalance. During this operation the measuring device determines how much light force was necessary to counterbalance the mass change on the sample and restore the system to equilibrium.

PATENTED JUL 6 1971
3,590,932
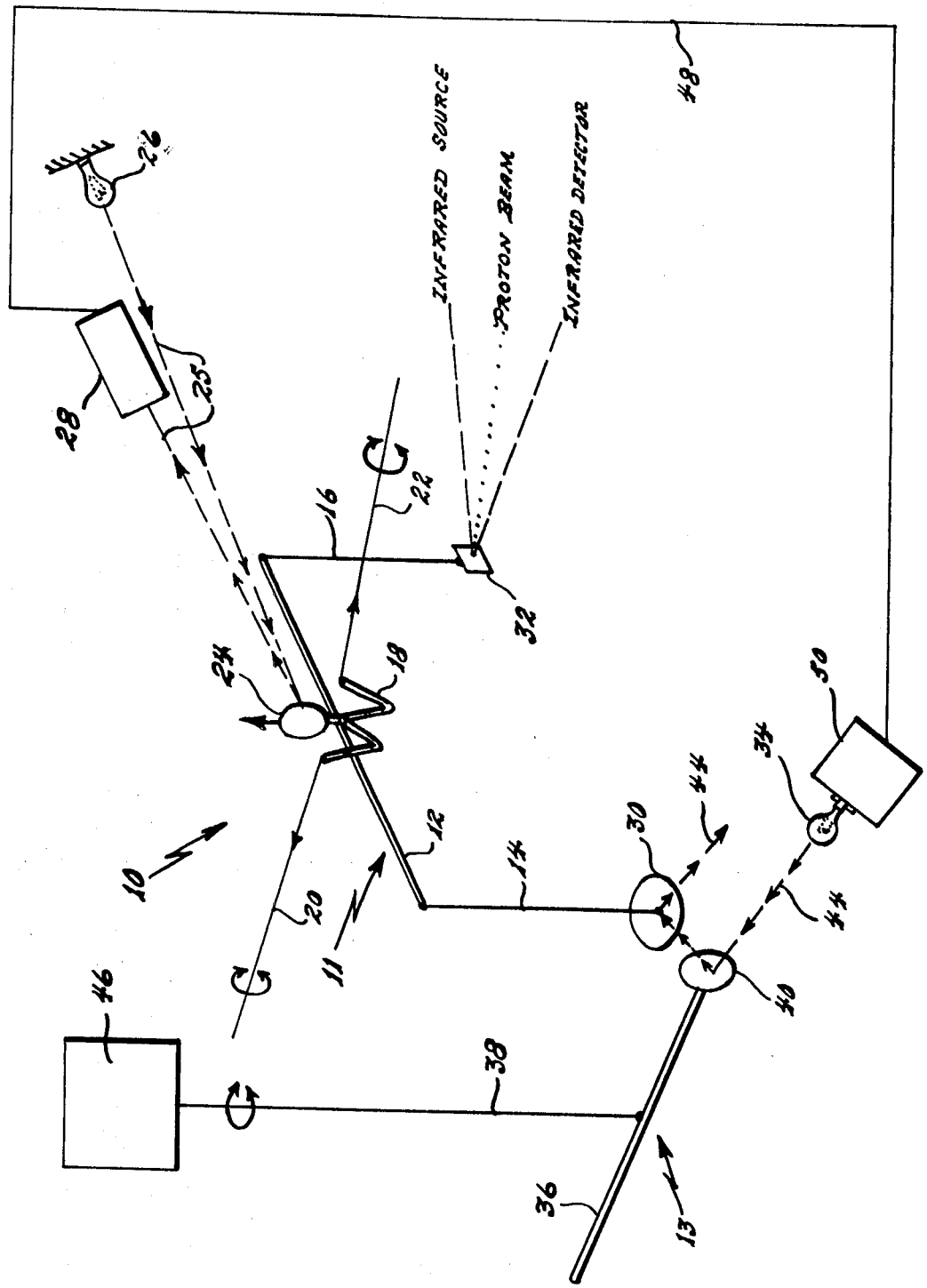
INVENTORS.
JENS P. DYBWAD AND
BY KARL P. ZINNOW
Harry A. Herbert Jr.
Jacob N. Erlich
ATTORNEYS

:// 3,590,932

LIGHT PRESSURE OPERATED MICROBALANCE

BACKGROUND OF THE INVENTION

This invention relates generally to devices for measuring small forces, and more particularly, to a microbalance which utilizes the pressure of light for counterbalancing minute force or mass changes on the microbalance.

It is necessary in many instances to determine the weight of objects, that is, the resultant force acting on a mass due to the earth's gravitational field. When the weight of an unknown is determined by comparison with a known weight, there is no error in readings due to gravity variations. Weight, unlike temperature, pressure, liquid level, and similar variables, is directly related to mass, a basic characteristic of matter. Therefore, it is frequently desirable to measure weight to a greater accuracy than most variables.

In most weighing devices or balances, the mass change of the sample under investigation must be counteracted by an opposing force. Usually these balances are either mass comparing devices, that is employing weight stones for compensation, or they are force-comparing devices, employing tension to compensate for forces acting on them. Heretofore, weights, springs, electromagnetic and electrostatic forces have been employed as the counterbalancing force. Microbalances of the past, utilizing electromagnetic and electrostatic forces, have been capable of detecting mass changes of less than one hundred millionth of a gram. Such microbalances, however, must be operated in a vacuum of at least $10^{16}$ torr to avoid buoyancy effects. In the most modern of vacuum pumps a considerable magnetic and electric field is generated thereby. Thus, these balances utilizing electromagnetic compensation, which in recent years evolved as the most reliable mode of controlling microbalances, could not be held completely free from interference during its operation within a vacuum envelope operated at a vacuum of at least $10^{16}$ torr.

For example, in the infrared studies of silicates bombarded with protons, measurement of the retention of hydrogen by the bombarded material and the adsorption of gas at its surface has to be carried out at pressures of $10^{11}$ torr, and thus in the vicinity of a 500 litre/sec. vacuum pump which generates a considerable magnetic field. Therefore, the best existing microbalances, which utilize magnetic techniques for restoring the balance, cannot be successfully used since interferring magnetic fields are present.

Furthermore, microbalances of the past had to be calibrated by the addition of small weights. To add such weights within a vacuum chamber, in most instances, is virtually impossible.

SUMMARY OF THE INVENTION

The instant invention sets for a microbalance which overcomes all the problems set forth hereinabove. The microbalance of this invention utilizes the pressure of light to counteract small forces as generated by weight changes on the microbalance. Thus, the study of adsorption, absorption, and sputtering of small samples can be performed under ideal conditions, that is within a vacuum chamber. Furthermore, the arrangement of the optical system of the microbalance of this invention makes calibration by weights unnecessary. The microbalance of the instant invention also permits the selection and continuous adjustment of the sensitivity of the microbalance during operation.

The microbalance of the instant invention is a small, extremely delicate type of glass mobile. The various elements of this invention are suspended by thin tungsten wires. Forming an essential part of the microbalance is a balance device comprising a balance beam made of any suitable material such as a glass rod which is mounted at the center apex of a small W-shaped glass spring. The spring is pulled tight by a pair of torsion wires attached thereto. Varying the tension on the torsion wires alters the shape of the W-shaped spring and therefore permits selection and continuous adjustment of the sensitivity of the microbalance during operation.

Hanging down from each end of the balance beam is a tungsten wire, and attached to one end of each of the wires is a weight and counterweight, respectively. Touching the balance beam imparts a slow up and down rocking motion, with periods of oscillation continuously adjustable between 15 and 60 seconds by altering the tension on the torsion wires. When a force change occurs on one side of the balance beam, the beam is deflected from the null position. In order to detect the null, a small vertical mirror is mounted at the center of the balance beam. Light reflected from the mirror is detected by any conventional detector when the null position has been reached.

The portion of this invention used to measure the force changes on one side of the balance is a measuring device made of an independently suspended mobile. This mobile comprises a horizontal rod attached near the center thereof to one end of tungsten wire, and a mirror attached at one end of the rod. A light source is directed at this mirror and due to the pressure of the light the rod will attempt to deflect or rotate by a few degrees. Any deflection is instantaneously compensated by counter rotating the suspension wire at the upper end. The amount of compensation rotation determines the force of the light. The mirror at the end of the horizontal rod is aligned to another mirror which forms one of the weights suspended from the balance beam of the balance device. If the optical geometry and the physical properties of the measuring device are known, the force of light applied to the balancing device can be calculated in order to calibrate the microbalance. After the balance beam with the sample under investigation in place has been brought back to the null position, the increase or decrease in light pressure and therefore the force necessary to counteract the mass change on the sample can be read out from a rotatable scale attached to the top end of the wire which suspends the horizontal rod.

The sensitivity of the microbalance of this invention can be further increased by swinging the balance beam in any conventional manner, such as by a pulsed light source, when the sample under investigation is in place. A signal pulse is generated by the detector each time the balance beam passes through the null position. As long as the sample under investigation and the tare weight are balanced the time intervals between signals will be equal at half a period each. Any mass changes by the sample will be registered as unequal time intervals by the signals. This will, in turn, activate a servo-driven control which varies the intensity of light beam and therefore its pressure until equilibrium is restored to the system. The increase or decrease in light pressure necessary to counteract the original mass change will be read out with a rotatable scale attached to the top end of the wire which suspends the horizontal rod.

It is an object of this invention to provide a microbalance which is extremely accurate and which can be utilized within the vicinity of a magnetic or electric field.

It is another object of this invention to provide a microbalance which has a sensitivity of better than $10^{18}$ g.

It is still another object of this invention to provide a microbalance which is easily calibrated.

It is a further object of this invention to provide a microbalance whose sensitivity can be continuously adjusted.

It is still a further object of this invention to provide a microbalance which is economical to produce and which utilizes conventional currently available materials that lend themselves to standard mass producing manufacturing techniques as well as laboratory construction.

For a better understanding of this invention together with other and further objects thereof, reference is made to the following description taken in connection with the accompanying drawing and its scope will be pointed out in the appended claims.

DESCRIPTION OF THE DRAWING

The only FIGURE of the drawing is a schematic view of the microbalance of this invention.

DESCRIPTION OF THE PREFERRED EMBODIMENT

Reference is now made to the only FIGURE of the drawing which shows the microbalance 10 of this invention in detail The microbalance 10 is made up of a balance device 11 and a measuring device 13. The balance device 11 has a balance beam 12 made of any suitable material, preferably a glass rod, and in this instance being a 250 mg. glass tube, 18 cm. long. A pair of wires 14 and 16, preferably of tungsten, and 10 $\mu$ in diameter, are fused to each end of the balance beam 12, respectively, for supporting a sample and a counterweight. A spring 18, such as a W-shaped glass spring, supports the balance beam 12 at the center thereof, with a pair of wires 20 and 22, made of any suitable material such as tungsten supporting spring 18. One of the wires 20 is fused to one end of spring 18 while the other wire 22 is fused to the other end thereof. These torsion wires, 20 and 22, support the balance beam 12 and by pulling on the wires, 20 and 22, the spring 18 will raise the center of mass of the balance beam 12 relative to the point of fusion of the wires thereto, thereby readily adjusting the sensitivity of the microbalance 10.

Thus, the sensitivity of the balance device 11 can be changed externally by adjusting the tension of the torsion wires 20 and 22. This eliminates the need to determine accurately the sensitivity during construction of the microbalance 10.

A mirror 24 is fused to the center of the balance beam 12 directly above the spring 18 and is utilized in conjunction with light source 26 and any conventional detector 28 such as a photo resistor in order to detect the null of the beam 12. This is accomplished by the directing of the light beam 25 from light source 26 onto the mirror 24 and back to the detector 28. The detector 28 can therefore discern at which time the balance beam 12 reaches its horizontal position (the null) and determine when a change of force on the sample has been counterbalanced by the force of light.

Referring again to wires 14 and 16, hanging from the bottom end of wire 14 is a counterweight made up of a mirror 30 for registering the force of light, and hanging from the bottom of wire 16 is the sample 32 to be investigated. For example, in one use of the microbalance 10 of this invention the sample 32 is silicates bombarded with protons utilized for the measurement of the retention of hydrogen by the bombarded material and the adsorption of gas at its surface.

Due to the extremely small mass change to be measured by the microbalance 10 of this invention, the counterweight utilizes the pressure of light as its counterbalancing force. It has been found, for example, that the pressure of the electromagnetic radiation of the sun is about $5 \times 10^{15}$ dyne/cm.$^2$ on a black surface on the earth, and twice the amount, $10^{14}$ dyne/cm.$^2$, on a mirror. Thus, sunlight on 1 sq. cm. of a mirror could counterbalance a mass change of $10^{17}$ g. Using an optical system, an equivalent pressure can be obtained from a lamp of about 30 w. A 650 w. quartz-iodine lamp 34 can be utilized in this invention at a very low power setting.

In the microbalance 10 of this invention the force of the light beam emanating from light source 34 is determined by a measuring device 13 which is utilized in conjunction with the balance beam 12 of the microbalance 10. The measuring device 13 is made of a horizontal rod 36 of any suitable material preferably glass and is suspended horizontally on a vertical wire 38 preferably tungsten fused substantially at the center of the glass rod 36. The wire 38 is about 7 $\mu$ in diameter and 45 cm. in length. A mirror 40 is located at one end of the rod 36. This mirror 40 is aligned to mirror 30 so that all the light received by mirror 40 deflects to mirror 30. The light beam 44 emanating from light source 34 is directed onto mirror 40 and causes a deflection of the rod 36. This deflection is instantaneously compensated for by turning the wire 38 at the upper end thereof until mirror 40 realigns with mirror 30. At the upper end of wire 38 is a rotatable scale 46 previously calibrated which determines the amount of deflection of rod 36 and therefore the force of the light beam 44. The measuring device 13 has a period of about 5 minutes and a calculated sensitivity of $4 \times 10^5$ degrees/dyne. Thus, a deflection of 4° caused by the light beam 44 corresponds to a pressure that can counterbalance $10^{18}$ g.

Any mass change by the sample 32 will move the balance beam 12 out of equilibrium. Such a movement is detected at detector 28 which will, in turn, activate, through electrical connection 48, a servo-driven control 50 associated with light source 34. Control 50 varies the intensity of the light beam 44 by any conventional means such as a shutter until equilibrium is restored to the system. The increase or decrease in light force necessary to counteract the original mass change will be read out at rotatable scale 46.

For increased sensitivity of the microbalance 10 of this invention, the balance beam 12 is oscillated. Any external force may be utilized to set the balance beam in motion, for example, light beam 44 may be pulsed. As the balance beam 12 is rocking, a signal pulse is generated by the detector 28 each time the balance beam 12 passes through the null position. As long as the sample under investigation at 32 and the tare weight are balanced, the time intervals between signals at detector 28 will be equal at one-half periods each. Any mass changes by the sample at 32 will be registered as unequal time intervals between signals. This will in turn activate, through electrical connection 48, a servo-driven control 50 associated with light source 34 and will vary the intensity of the source 34 until equilibrium is restored. The increase or decrease in light force necessary to counteract the original mass change will be read out at the rotatable scale 46 utilized in conjunction with the measuring device 13 of this invention.

In operation the microbalance 10 is initially set at the null position by rotating the torsion wires 20 and 22 accordingly. The sensitivity of the balance beam 12 is then adjusted by regulating the tension on torsion wires 20 and 22, thereby either raising or lowering the center of mass of beam 12 relative to the point of fusion of wires 20 and 22 to spring 18. If necessary, the microbalance 10 may be even more finely balanced with the force of light beam 44 utilized as a counterbalancing force.

When mass is now added to the sample 32 of balance beam 12, the null detector 28 receives a light beam from mirror 24 which signifies that the balance beam 12 is no longer in the null position. This information is utilized to vary the intensity of light beam 44 striking the measuring mirror 40. The light pressure of beam 44 attempts to deflect the measuring mirror 40 out of alignment with the balance mirror 30. Any deflection of balance mirror 40 is instantaneously brought back to alignment by rotating the torsion wire 38. Just enough light pressure is applied to the counterweight mirror 30 of the balance beam 12 to compensate for the weight change of the sample at 32 and thus bring the entire system back into equilibrium (the null position). The amount of light pressure necessary to do so is regulated by the null detector 28. Because the torsion properties of the wire 38 holding the measuring mirror 40 are known, the weight added to one side of the microbalance 10 can be derived by how much the wire must be rotated to compensate for the light pressure needed to restore the balance to equilibrium. This rotation is determined by any conventional rotational scale 46 located at the top end of wire 32.

The microbalance 10 of this invention is capable of measuring weight changes to an accuracy of better than $10^{18}$ g. Furthermore, the operation of this invention is not adversely affected by magnetic or electric fields nearby.

Although the invention has been described with reference to a particular embodiment, it will be understood to those skilled in the art that the invention is capable of a variety of alternative embodiments within the spirit and scope of the appended claims.

What we claim is:

1. A microbalance comprising a balance device and a measuring device, said balance device being made up of a balance beam, means for supporting said balance beam, said balance beam supporting a sample to be investigated at one end thereof and a means for receiving a light beam at the other end thereof, said measuring device being made up of a horizontal rod, means for supporting said rod, said rod having a means for receiving and transmitting a light beam secured at one end thereof, said receiving and transmitting means being optically aligned with said receiving means on said balance beam, and a light source for producing a light beam positioned so that said light beam strikes said receiving and transmitting means on said horizontal rod, whereby varying the forces on said sample moves said balance beam out of equilibrium and varying the intensity of said light beam counterbalances said force change.

2. A microbalance as defined in claim 1 wherein said means for supporting said balance beam comprising a spring fixedly secured to the center of said beam, a wire fixedly secured to one end of said spring and another wire fixedly secured to the other end of said spring whereby varying the tension on said wires varies the sensitivity of said balance beam.

3. A microbalance as defined in claim 2 wherein said spring is a W-shaped spring.

4. A microbalance as defined in claim 3 wherein a means for reflecting a light beam is fixedly secured to the center of said balance beam, a light source for producing a light beam is located adjacent said reflecting means and a light detector is located adjacent said reflecting means for receiving said reflected light beam, whereby said detector determines whether or not said balance beam is in equilibrium.

5. A microbalance as defined in claim 4 wherein said means for supporting said horizontal rod is a wire and a rotatable scale is mounted at the top end of said wire for determining the amount of deflection of said horizontal rod under the force of said light beam.

6. A microbalance as defined in claim 5 wherein said detector is electrically connected to said light source for varying the intensity of said light beam.

7. A microbalance as defined in claim 6 wherein said receiving and transmitting means are mirrors.

8. A microbalance as defined in claim 7 wherein said spring is made of glass.

9. A microbalance as defined in claim 8 wherein said balance beam and rod are made of glass.

10. A microbalance as defined in claim 9 further comprising means for oscillating said balance beam.